United States Patent
Lee

(10) Patent No.: US 6,665,093 B2
(45) Date of Patent: *Dec. 16, 2003

(54) SHADING CORRECTION METHOD FOR SHUTTLE SCANNING DEVICE

(75) Inventor: Hyuk-Jae Lee, Yongin-si (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 110 days.

(21) Appl. No.: 09/200,602

(22) Filed: Nov. 27, 1998

(65) Prior Publication Data

US 2002/0063874 A1 May 30, 2002

(30) Foreign Application Priority Data

Nov. 29, 1997 (KR) .............................. 97-64363

(51) Int. Cl.⁷ ............................................. H01J 40/14
(52) U.S. Cl. ........................................ 358/1.9; 382/274
(58) Field of Search ................ 358/1.9, 461; 382/274

(56) References Cited

U.S. PATENT DOCUMENTS

| | | | | | |
|---|---|---|---|---|---|
| 4,888,492 A | * | 12/1989 | Arimoto | ...................... | 250/578 |
| 5,099,341 A | * | 3/1992 | Nosaki et al. | .............. | 358/461 |
| 5,237,172 A | * | 8/1993 | Lehman et al. | .............. | 250/235 |
| 5,323,473 A | * | 6/1994 | Lau | ............... | 382/48 |
| 5,424,537 A | * | 6/1995 | Lehman et al. | .............. | 250/235 |
| 5,647,026 A | * | 7/1997 | Kwarta | ....................... | 382/270 |
| 5,771,106 A | * | 6/1998 | Taguchi et al. | .............. | 358/461 |
| 5,787,192 A | * | 7/1998 | Takaichi et al. | ............ | 382/166 |
| 5,903,659 A | * | 5/1999 | Kilgore | ....................... | 382/103 |

* cited by examiner

*Primary Examiner*—Thomas D. Lee
*Assistant Examiner*—Stephen Brinich
(74) *Attorney, Agent, or Firm*—Robert E. Bushnell, Esq.

(57) ABSTRACT

A method of calculating a precise scanning reference value for a shading correction by dividing a scanning area under a reciprocating scanner into a practical scanning area and a shading correction scanning area. This method includes the steps of: entering a shading correction mode; moving the scan head to the shading correction scanning area; reading a plural number of scanning values in moving within the shading correction scanning area; and calculating the scanning reference value by using said plural number of scanning values.

19 Claims, 2 Drawing Sheets

SHADING CORRECTION METHOD FOR SHUTTLE SCANNING DEVICE

CLAIM OF PRIORITY

Figure 1:
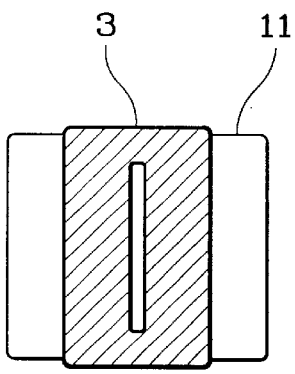

This application makes reference to, incorporates the same herein, and claims all benefits accruing under 35 U.S.C. §119 from my application entitled SHADING CORRECTION METHOD ON SHUTTLE SCANNING DEVICE filed with the Korean Industrial Property Office on Nov. 29, 1997 and there duly assigned Serial No. 64363/1997 by that Office.

BACKGROUND OF THE INVENTION

1. Field of the Invention

The present invention relates to a method for optical scanning, and more particularly to a method for providing a shading correction for a reciprocating, shuttle scanner.

2. Discussion of Related Art

A shading correction method used in a conventional shuttle scanning device involves reading a value with the scan head in a stopped state after the scan head is moved to a position on a reference white panel. The shading correction method involves using this value at the time of an actual scanning of a document by employing the value as a shading factor, after having scanned through throwing lights at a position located by the white panel.

In the case of a particular method, median filtering is used in order to avoid a shading correction error which can occur through reading a polluted or dirty part of the white panel. This is a method of eliminating spot noises by excluding a maximal value and a minimal value. Further, a method of using an average value, taken after having read the white panel several times, as a factor value is also used to avoid a line movement after a shading correction due to nonuniformity of the shading factor due to white, Gaussian, random noise.

The shuttle scanner operates scanning at a right angle to the feeding direction. When scanning, the scan head is not in an ideal stopped state and so inclination occurs. For this reason, a difference can occur between the scanning state at the time of the reading to determine the shading factor and the scanning state at the time of scanning an actual image area. As a result of this inaccuracy of the shading correction, more errors may occur than in case of not taking an average value.

The shading correction method using the shading factor average value involves taking an average value by reading the shading factor several times with the scan head in a stopped position. Accordingly, this method has a disadvantage of insufficiently reproducing the shading situation when the scan head is actually moving.

Based on my observation of the art, I have found that what is needed is a method of providing a shading correction which avoids the errors associated with the methods of the background art. In particular, I wish to eliminate the problems associated with using a shading factor obtained using a stopped print head for scans obtained using a moving scan head.

SUMMARY OF THE INVENTION

It is therefore an object of the present invention to provide an improved method for performing a shading correction for a shuttle scanner.

It is a further object to provide a method for providing a precise scanning reference value for use in a shading correction.

It is a yet further object to provide a method for performing a shading correction which prevents incorrect measurement of the shading correction factor.

It is a still further object to provide a method for performing a shading correction which avoids the inaccuracy due to measuring the shading correction factor while the scan head is stopped.

It is a still yet further object to provide a method for performing a shading correction which avoids errors due to dirt on the reference white panel.

It is another object of the present invention to provide a shading correction under condition similar to an actual scanning operation by measuring the shading factor while the scan head is moving.

To achieve these and other advantages and in accordance with the purpose of the present invention, as embodied and broadly described, there is provided a method of calculating a precise scanning reference value for a shading correction by dividing a scanning area under a reciprocating scan head into a practical scanning area and a shading correction scanning area. This method includes the steps of: entering a shading correction mode; moving the scanner to the shading correction scanning area; reading a plural number of scanning values while moving within the shading correction scanning area; and determining the scanning reference value by using said plural number of scanning values.

BRIEF DESCRIPTION OF THE ATTACHED DRAWINGS

Figure 2:
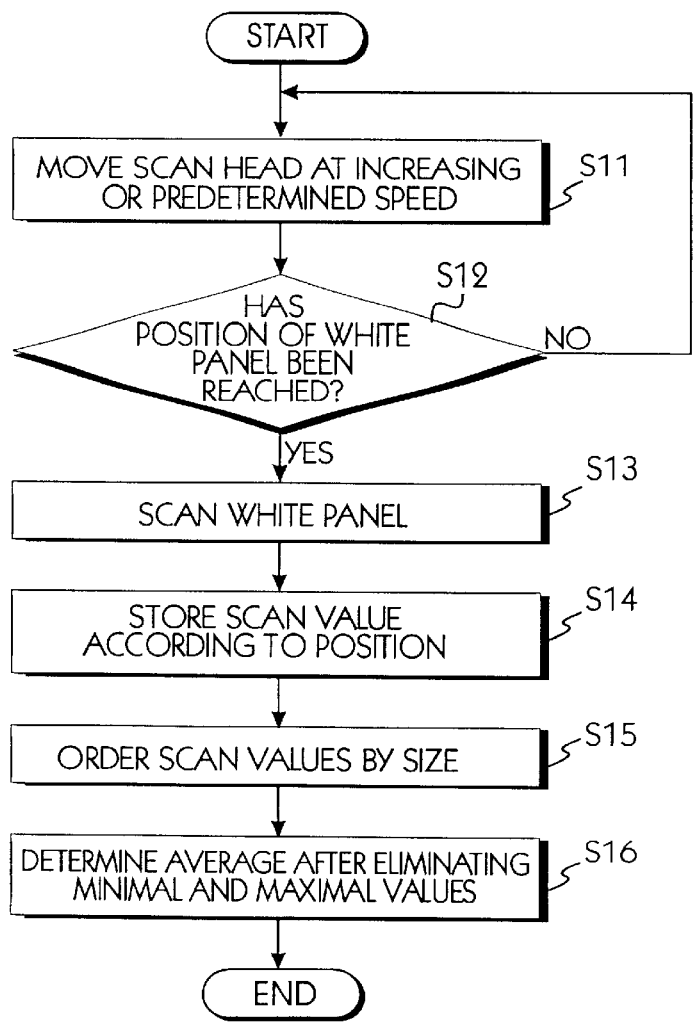
Figure 3:
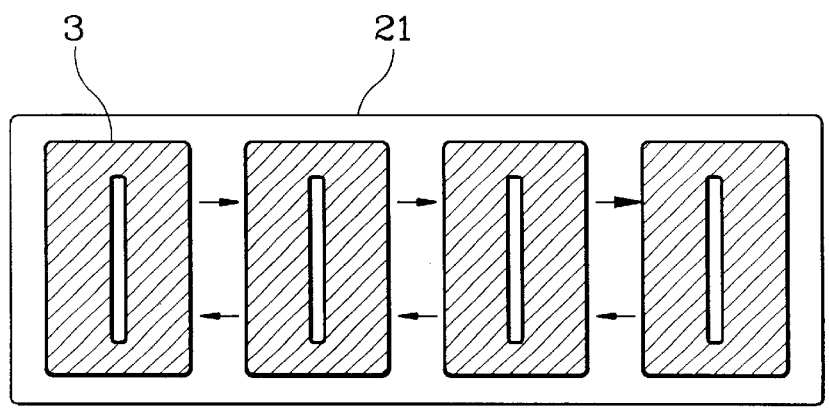
Figure 4A:
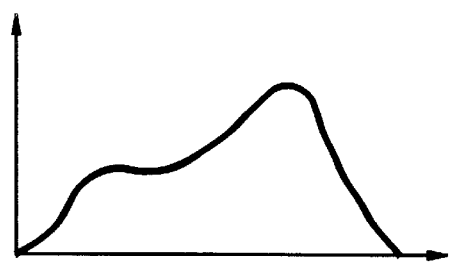

A more complete appreciation of the invention, and many of the attendant advantages thereof, will be readily apparent as the same becomes better understood by reference to the following detailed description when considered in conjunction with the accompanying drawings in which like reference symbols represent the same or similar components, wherein:

FIG. 1 illustrates a shading correction method in a conventional shuttle scanning device, FIG. 2 is a flow chart illustrating a progress process of the shading correction method in accordance with the present invention, FIG. 3 is an operation embodiment of the shading method in accordance with the present invention, FIGS. 4A and B are graphs comparing the shading distribution obtained using a scan head in a stopped state and in a moving state, respectively.

DETAILED DESCRIPTION OF THE DRAWINGS

Turning now to the drawings, the shading correction method in a conventional shuttle scanning device is illustrated in FIG. 1, where scan head, or scanner, 3 has moved to a position on reference white panel 11. The shading correction method is used at the time of an actual scanning by employing the value as a shading factor after having scanned through throwing lights at a position located by white panel 11.

The present invention is now described in detail in conjunction with the accompanying drawings as follows. FIG. 2 is a flow chart illustrating the process of performing of the present invention. First, the scanner enters the shading correction mode (Start). Then, the scan head gets driven with increasing speed or with a predetermined speed, process S11, and then is moved until the position occupied by the white panel is reached, process S12. The scan head scans with predetermined speed over the position occupied by the white panel, as shown in FIG. 3. Whereas conventional techniques make the scan head scan, that is obtain readings, while in a stopped state at the location of white panel 21, the present invention has scan head 3 scan, while driving with predetermined speed, at many places of white panel 21. Scan head 3 scans in moving in the left→right then right→left direction with a predetermined speed, as indicated by the arrows in FIG. 3. In FIG. 3, we can see that the white panel of the invention is a little longer than the conventional white panel in order that the scan head can scan white panel 21 while operating with the predetermined speed, process S13.

The scanning value of the white panel according to process S13, as shown in Table 1, forms two-dimensionally disposed information which is stored in any memory place. Table 1, shown below, is an example of such information which is a result taken by the scanner having a length of four pixels, taken at three positions, in process S14.

TABLE 1

|  | first scan position | second scan position | third scan position |
|---|---|---|---|
| pixel position (1) | 254 | 251 | 255 |
| pixel position (2) | 254 | 249 | 248 |
| pixel position (3) | 150 | 249 | 245 |
| pixel position (4) | 254 | 248 | 252 |

The scanning data stored in memory places for each pixel position are arranged according to the size of the value as shown in Table 2, process S15.

TABLE 2

|  | minimum | medium | maximum |
|---|---|---|---|
| pixel position (1) | 251 | 254 | 255 |
| pixel position (2) | 248 | 249 | 254 |
| pixel position (3) | 150 | 245 | 249 |
| pixel position (4) | 248 | 252 | 254 |

The average value of the values with exception of the minimal value and the maximal value is then determined, so as to be used as a shading factor, process S16. In the example shown, with three scan values measured, there is only one value left after eliminating the minimal and maximal values so this is the value shown in Table 3.

TABLE 3

|  | average value excepting minimum and maximum |
|---|---|
| pixel position (1) | 254 |
| pixel position (2) | 249 |
| pixel position (3) | 245 |
| pixel position (4) | 252 |

Figure 4B:
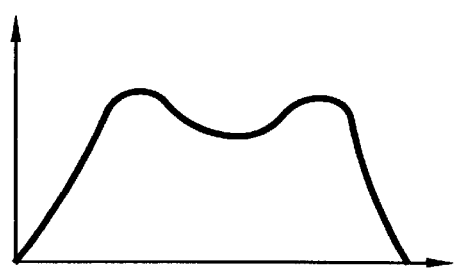

FIG. 4 is a graph illustrating a shading disposition according to an actual experimental result, where the x axis indicates scanner position and the y axis indicates light quantity. FIG. 4(A) shows a shading disposition when the scan head is in a stopped state according to the conventional technique. FIG. 4(B) shows a shading disposition in a movement of the scanner according to the present invention. FIG. 4(B) illustrates that the method of the present invention prevents the reading of a distortion of the shading factor, that is, an inappropriate shading factor.

As explained above, the present invention can prevent a horizontal line from occurring in an image due to the distortion of the shading factor disposition read with the scan head in the stopped state. Also, the distortion of the shading factor which occurs when the shading panel is dirty can be reduced by the effect of the median filtering.

It will be apparent to those skilled in the art that various modifications can be made in the shading correction method a shuttle scanning device of the present invention, without departing from the spirit of the invention. Thus, it is intended that the present invention cover such modifications as well as variations thereof, within the scope of the appended claims and their equivalents.

What is claimed is:

1. A method of performing a shading correction for a reciprocating scanner, comprising the steps of:

entering a shading correction mode;

moving a scan head to a reference area having a plurality of pixel positions;

when said reference area is reached by said scan head, obtaining a plurality of scan values from each of said pixel positions while moving the scan head across the reference area; and determining a value of a shading correction factor from said scan values.

2. The method of claim 1, further comprising:

said step of moving said scan head to said reference area comprising increasing the speed of said scan head until a predetermined speed is reached; and said movement of said scan head across the reference area being at said predetermined speed.

3. The method of claim 1, further comprised of using a white panel as said reference area.

4. The method of claim 1, where said determining step comprises performing the average of the scan values other than maximal and minimal of said scan values.

5. The method of claim 1, where said determining step comprises the steps of:

storing said scan values in a memory;

arranging said scan values in said memory in order of size;

eliminating maximal and minimal values of said scan values in said memory; and averaging remaining scan values stored in said memory.

6. The method of claim 1, further comprising the steps of:

scanning a document with said scan head; and, determining a corrected document scan value using said shading correction factor.

7. The method of claim 1, wherein said pixel positions are different from each other within said reference area.

8. The method of claim 1, further comprised of moving said scan head across the reference area at least two times in order to obtain said scan values from each of said pixel position.

9. The method of claim 1, further comprised of moving said scan head across the reference area in a first direction while obtaining said scan value from said pixel positions, and moving said scan head across the reference area in a second direction while obtaining a second set of said scan values from said pixel positions.

10. The method of claim 1, further comprised of obtaining at least two sets of said scan values from each of said pixel positions.

11. The method of claim 1, further comprised of obtaining at least three sets of said scan values from each of said pixel positions when said scan head moves across the reference area in three directions.

12. A method of performing a shading correction for a reciprocating scanner, comprising the steps of:

entering a shading correction mode;

moving a scan head to a reference area having a plurality of pixel positions;

when said reference area is reached by said scan head, obtaining a plurality of scan values from each of said pixel positions while moving the scan head across the reference area without stopping in the reference area; and determining a value of a shading correction factor from said scan values.

13. The method of claim 12, further comprising the steps of:

increasing the speed of said scan head until a predetermined speed is reached; and moving said scan head across the reference area at said predetermined speed.

14. The method of claim 12, further comprising the step of providing a white panel having said reference area.

15. The method of claim 12, further comprising the step of generating said value based on an average of the scan values from each of said pixel positions other than maximal and minimal values of said scan values.

16. The method of claim 12, further comprising the steps of:

storing said scan values obtained from each of said pixel positions in a memory;

arranging said scan values of each of said pixel positions in said memory in order of size;

obtaining remaining scan values by eliminating maximal and minimal values of said scan values from said scan values for each of said pixel positions in said memory; and averaging the remaining scan values for each of said pixel positions stored in said memory.

17. The method of claim 12, further comprising the steps of:

scanning a document with said scan head; and determining a corrected document scan value using said shading correction factor.

18. The method of claim 12, further comprised of moving said scan head across the reference area in a first direction while obtaining said scan value from said pixel positions, and moving said scan head across the reference area in a second direction while obtaining a second set of said scan values from said pixel positions.

19. A shading correction apparatus, comprising:

a reference panel including an area having a plurality of pixel positions;

a scan head disposed to move to said area of said reference panel, and obtain a plurality of scan values from each of said pixel positions while moving over said reference panel; and a controller coupled to said scan head to generate a value of a shading correction factor in accordance with said scan values for each of said pixel positions.

* * * * *